(No Model.) 3 Sheets—Sheet 1.
A. PETTINATI.
BICYCLE.
No. 571,051. Patented Nov. 10, 1896.
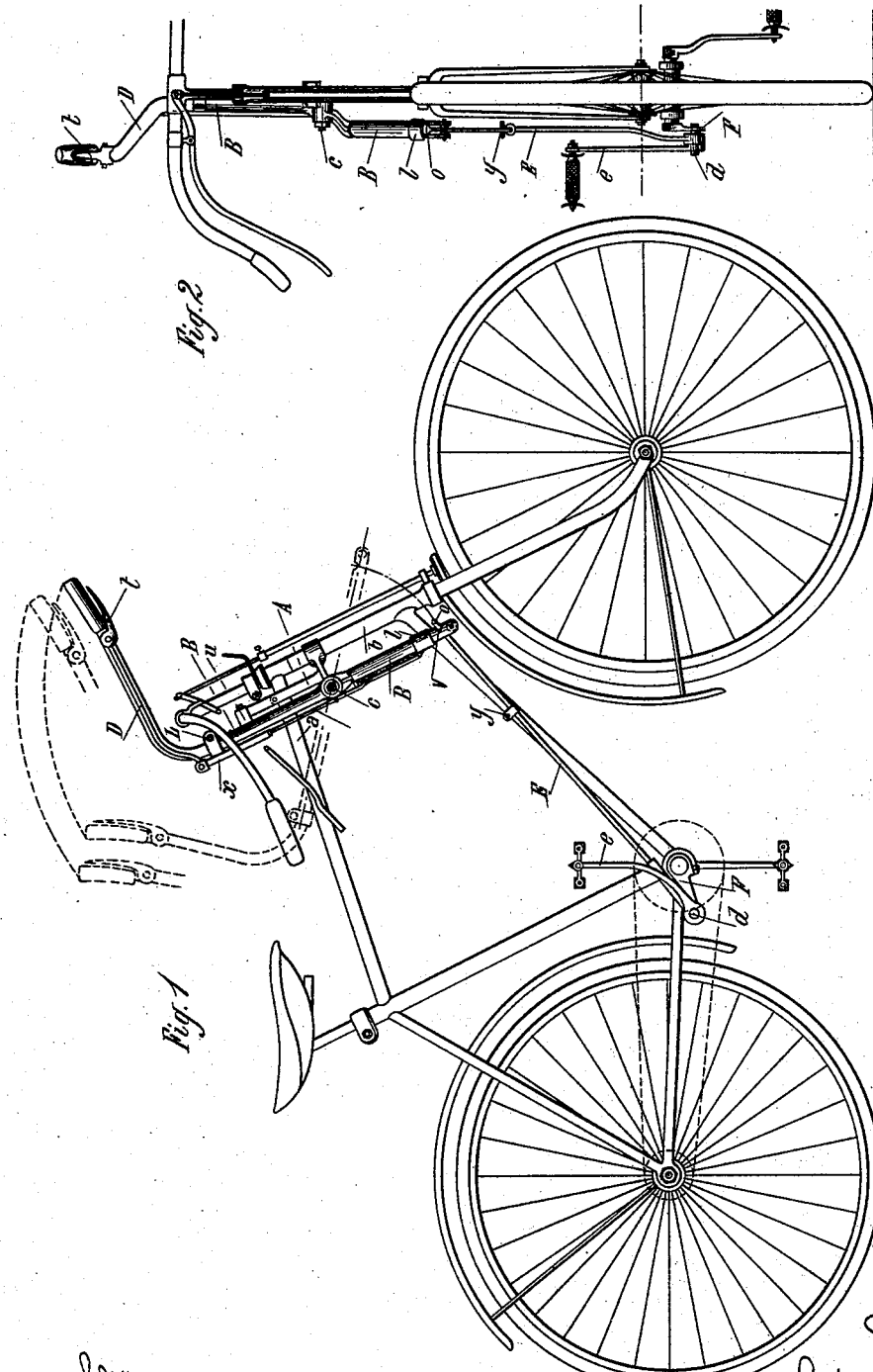
Witnesses
H. van Dedemeel
Otto Munk
Inventor
Antonio Pettinati
by Richardson
Attorneys

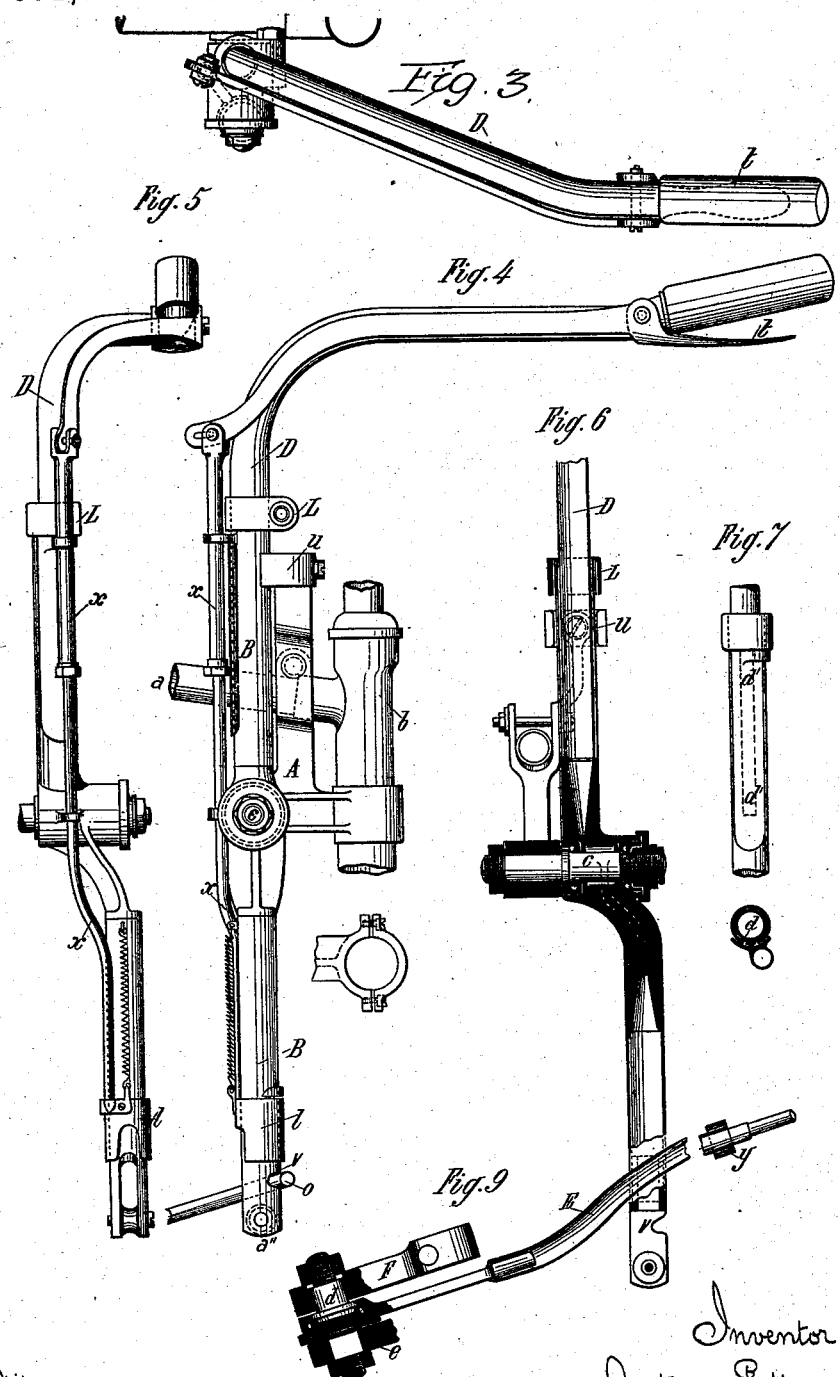

(No Model.) 3 Sheets—Sheet 3.
A. PETTINATI.
BICYCLE.
No. 571,051. Patented Nov. 10, 1896.
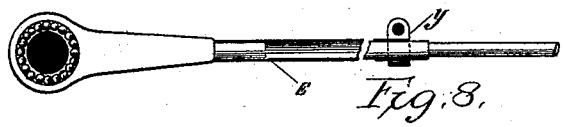
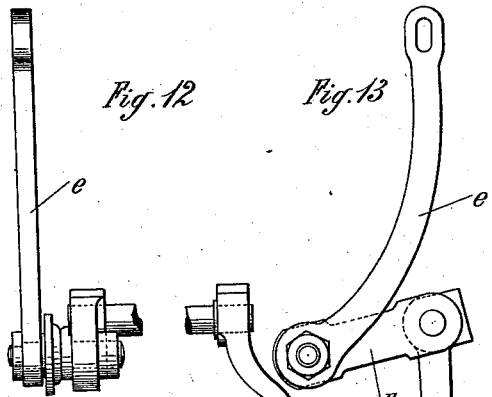
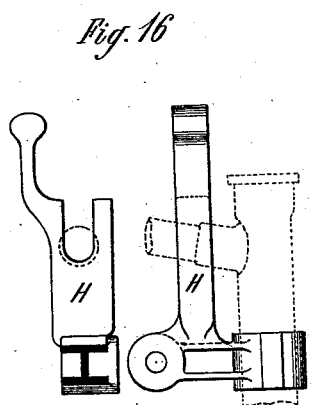
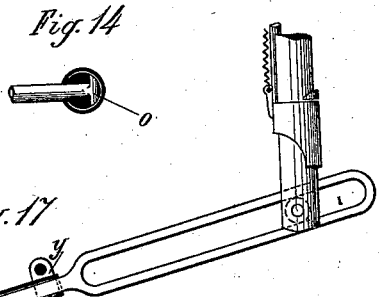
Witnesses
H. van Oldenneel
Otto Munk
Inventor
Antonio Pettinati
by Richards
Attorneys

UNITED STATES PATENT OFFICE.

ANTONIO PETTINATI, OF ROME, ITALY.

BICYCLE.

SPECIFICATION forming part of Letters Patent No. 571,051, dated November 10, 1896.

Application filed July 10, 1895. Serial No. 555,512. (No model.) Patented in Italy June 5, 1895, LXXVI, 144.

*To all whom it may concern:*

Be it known that I, ANTONIO PETTINATI, a subject of the King of Italy, residing at Rome, in the Kingdom of Italy, have invented certain new and useful Improvements in Bicycles, of which the following is a specification.

This invention has been patented in Italy June 5, 1895, Vol. 76, No. 144.

My invention relates to improvements in the means for aiding the propulsion of bicycles and other similar vehicles, and has for its object to provide a simple and efficient device whereby the rider can help with his hands in propelling the vehicle instead of using only his feet, as heretofore, so that it will be much easier to go up heavy gradients, or a greater speed may be obtained with much less stress upon the rider.

The invention consists in the construction and arrangement of parts hereinafter described, and particularly pointed out in the claims.

In order that my said invention may be more fully understood, reference will be made to the annexed drawings, in which like letters of reference indicate the same or corresponding parts through the various figures.

Figure 1 is a side view of a bicycle embodying my invention, and Fig. 2 is a front view of the same. Fig. 3 is a top view of my improved device detached from the bicycle. Figs. 4 and 5 are a side view and a rear view, respectively, of same. Fig. 6 is a vertical section on line $a'$ $a''$ of Fig. 4. Fig. 7 is a side view and cross-section of the outer and inner tubes forming the lever. Fig. 8 is a side view of the connecting-rod. Fig. 9 is a top sectional view of same connected to the cam. Fig. 10 is a section on line $m$ $m'$ of Fig. 9. Fig. 11 is a section on line $n$ $n'$ of Fig. 9. Fig. 12 is a front view showing the connection of the treadle-cranks to the shaft. Fig. 13 is a right-hand side view of the treadle-cranks. Fig. 14 is a section on line $s$ $s'$ of Fig. 4, showing a detail of construction. Fig. 15 is a cross-section on line $r$ $r'$ of Fig. 4. Fig. 16 is a detail view of the means for securing my improved device to the frame of the bicycle. Fig. 17 shows a modification in the connection between the connection-rod and the lever.

In the modification shown in Fig. 17, when the device is not in use, the connecting-rod slides up and down upon a roller-pin $k$, thus avoiding the jarring when riding over bad roads.

D is a tubular rod or lever sliding in and adjustably secured to the tubular rod or lever B by a scarf L, the said lever being pivoted at $c$ in the support A, screwed to the frame of the bicycle. At its lower end said lever B is connected, through a connecting-rod E, to a lever F, which is secured to the driving-shaft of the bicycle, in the shape of a crank. At its upper end the lever D is bent and ends in the shape of a handle, by which the device is operated. The upper lever D is free to slide up and down in the one B, but cannot revolve therein on account of the lock or spline $d'$ $d'$. (Shown in Fig. 7.) The operator can thus lengthen or shorten this lever by simply loosening the nut upon the scarf L, so as to have a greater or smaller leverage, as desired.

The connecting-rod E consists of two parts, sliding one inside the other, adjustably secured together by a scarf $y$, so that it may be lengthened or shortened, as required.

The connecting-rod E is connected with the lower end of the arm B by a sliding connection, preferably by passing the rod through an opening in the portion B, as shown in detail in Figs. 4 and 5. The end of the rod is headed, as shown at $o$, and a corresponding notch or countersink is formed in the portion B around the opening through which the rod passes, this countersink $v$ being large enough to receive the head of the rod. A hand-lever $t$, pivoted to the portion D, connects through suitable telescoping rods $x$ with a sliding collar $l$, which is adapted to slide down over the head O and hold it within the countersink. It will thus be seen that when the collar is elevated the rod can reciprocate freely in the opening; but pressure on the lever $t$ will lower the collar to lock the rod securely to portion B.

Instead of the connection just described that shown in Fig. 17 may be employed, in which the end of the rod is looped and the rear side of the collar is cut away to allow the front side to come down over the end of the rod.

In order to hold the lever or handle stationary when not in use, a spring-catch $u$ is provided on the support A, between the arms of which a projection or block on the lever may be forced, as clearly shown in Fig. 15.

I prefer to connect the rod to the crank-axle by means of a crank F, to the outer end of which I secure a bent crank $e$, so that the end of this crank terminates exactly opposite the other crank, which is preferably bent outwardly, as shown in Fig. 12.

I prefer to connect the rod E to the crank by a ball-bearing joint, as shown in Fig. 8. It is also desirable to mount the lever B upon a ball-bearing, as shown in Fig. 6.

As may be easily seen my improved device can be easily applied to any bicycle without making any alteration in any part of the machine, except one of the treadle-cranks, which must be made to fit the cam and connecting-rod.

The operation of the device is as follows: The rider grasps with his right hand the handle at the end of lever D and pulls it, in order to start the lever, taking care at the beginning to exert a small pressure with the fingers upon its attachment $t$, so that the lever is in first place relieved from its spring-clasp $u$, by which it is held when not in use, and then, with its notch $v$, it meets the headed end $o$ of the connecting-rod E and locks it, on account of the collar $l$ being lowered by the rod $x$, pressed down by the pressure of the hand upon the attachment $t$. The connecting-rod is thus operatively connected with the lever, and by continuing to move back and forward the handle of the lever D a considerable amount of power is applied to the bicycle. When the lever is not wanted to operate, it is simply necessary to leave hold of it with the hand, pushing it toward the spring-clasp $u$, to which it becomes fastened.

In order to insure an easy working, all the operating parts are connected together by ball-bearings, as shown in the drawings.

I desire it to be clearly understood that my invention is not limited to the details of construction shown in the drawings, as many of them can obviously be changed without departing from the gist of my said invention.

I claim—

1. In combination with a bicycle, a hand-lever pivotally connected to the head thereof, a rod having one end pivotally connected with the crank and at the other end a sliding connection with said lever, and means for changing the sliding connection into a fixed connection at will, substantially as described.

2. In combination with a bicycle, the bracket removably clamped to the head thereof, the hand-lever pivoted to said bracket, the rod having one end pivoted to the crank and having its other end sliding in a recess in the hand-lever, a catch for connecting and disconnecting said rod and lever, and operating connections from said catch to the handle of said hand-lever, substantially as described.

3. In combination with a bicycle, the hand-lever pivoted to the frame thereof, the handle adjustably connected therewith, the rod having one end pivoted to the crank and having at its other end a sliding connection with said lever, and means for changing said sliding connection into a fixed connection at will, substantially as described.

4. In combination with a bicycle, a hand-lever pivotally connected with the head thereof, a rod having one end pivoted to the crank and at its other end having a sliding connection with the lower end of said lever, a collar sliding on the hand-lever and arranged to slide over the end of the rod to confine it against movement, and means for operating the collar, substantially as described.

In witness whereof I have hereunto set my hand in presence of two witnesses.

ANTONIO PETTINATI.

Witnesses:
WALLACE S. JONES,
G. B. ZANARD.